US009946647B2

United States Patent
Solihin

(10) Patent No.: US 9,946,647 B2
(45) Date of Patent: Apr. 17, 2018

(54) DIRECTORY COHERENCE FOR MULTICORE PROCESSORS

(71) Applicant: Empire Technology Development LLC, Wilmington, DE (US)

(72) Inventor: Yan Solihin, Raleigh, NC (US)

(73) Assignee: EMPIRE TECHNOLOGY DEVELOPMENT LLC, Wilmington, DE (US)

( * ) Notice: Subject to any disclaimer, the term of this patent is extended or adjusted under 35 U.S.C. 154(b) by 0 days.

(21) Appl. No.: 15/306,021

(22) PCT Filed: Apr. 24, 2014

(86) PCT No.: PCT/US2014/035352
§ 371 (c)(1),
(2) Date: Oct. 21, 2016

(87) PCT Pub. No.: WO2015/163895
PCT Pub. Date: Oct. 29, 2015

(65) Prior Publication Data
US 2017/0046263 A1   Feb. 16, 2017

(51) Int. Cl.
G06F 12/08 (2016.01)
G06F 12/0811 (2016.01)
G06F 12/0817 (2016.01)

(52) U.S. Cl.
CPC ...... *G06F 12/0811* (2013.01); *G06F 12/0826* (2013.01); *G06F 12/0817* (2013.01); *G06F 2212/1028* (2013.01); *G06F 2212/621* (2013.01); *G06F 2212/622* (2013.01); *Y02B 60/1225* (2013.01)

(58) Field of Classification Search
None
See application file for complete search history.

(56) References Cited

U.S. PATENT DOCUMENTS

| 6,711,447 B1 | 3/2004 | Saeed |
| 2014/0032829 A1 | 1/2014 | Solihin |
| 2014/0229680 A1 | 8/2014 | Solihin |

OTHER PUBLICATIONS

"International Search Report and Written Opinion for PCT/US2014/035352 dated Sep. 23, 2014".
Borkar,, et al., "The Future of Microprocessors", Communications of the ACM, vol. 54, No. 5, pp. 67-77 (May 2011).
Carter, et al., "Runnemede: An Architecture for Ubiquitous High-Performance Computing", Proceedings of the IEEE 19th International Symposium on High Performance Computer Architecture (HPCA), pp. 198-209 (2013).

(Continued)

*Primary Examiner* — Kevin Verbrugge
(74) *Attorney, Agent, or Firm* — Dorsey & Whitney LLP

(57) ABSTRACT

A cache coherence mechanism may comprise a bit-to-cache map for processor cores operable up to a maximum frequency for cores of a multicore processor. Entries in a cache coherence directory may include a bit field identifying cores operable at or near the maximum frequency that share a memory block corresponding to the entry. An additional field may indicate sharing by cores operating at lower frequencies. The additional field may be indicative of the bit-field corresponding to a bit-to-cache map representative of cores other than those operating at or near the maximum frequency.

19 Claims, 9 Drawing Sheets

(56) References Cited

OTHER PUBLICATIONS

Hijaz, et al., "Low-Latency Mechanisms for Near-Threshold Operation of Private Caches in Shared Memory Multicores", Proceedings of the 45th Annual IEEE/ACM International Symposium on Microarchitecture Workshops, pp. 68-73 (Dec. 2012).
Martin, et al., "Why On-ChipCache Coherence is Hereto Stay", Communications of the ACM, vol. 55, Issue7, pp. 78-89 (Jul. 2012).

DIRECTORY COHERENCE FOR MULTICORE PROCESSORS

CROSS-REFERENCE TO RELATED APPLICATION

This application is a U.S. National Stage filing under 35 U.S.C. § 371 of PCT Application No. PCT/US2014/035352, filed Apr. 24, 2014 which application is incorporated herein by reference in its entirety, for any purpose.

BACKGROUND

Unless otherwise indicated herein, the materials described in this section are not prior art to the claims in this application and are not admitted to be prior art by inclusion in this section.

Power consumption by a multicore processor may be reduced by operating the cores at near-threshold voltages. In general, dynamic power consumption may be quadratically proportional to supply voltage and linearly proportional to clock frequency. Accordingly, reducing the supply voltage and corresponding clock frequency may reduce power consumption by a significant amount. However, due to manufacturing variations, there may be differences in the threshold voltages and maximum operating frequencies between the various cores of a multicore processor.

SUMMARY

Various techniques to maintain cache coherency on a multicore processor are disclosed herein. Methods and systems are disclosed in which cache coherence is maintained for multicore processors having cores operating in different frequency bands, such as near-threshold voltage processors. Such a method or system may include a cache coherence directory with entries containing a bit sharer field sized to represent a subset of cores operating at a highest frequency, and a map from which core identifiers may be obtained based on a bit position within a bit sharer field. Bits may be set in the bit sharer field to indicate which of the cores caches a shared block of memory.

A method to maintain cache coherence may comprise maintaining a first bit-to-cache map, wherein the first bit-to-cache map comprises a first core identifier corresponding to a first core and a second core identifier corresponding to a second core, the first and second cores operable up to a first frequency. The method may further comprise maintaining one or more entries in a first directory, a first entry of the one or more entries comprising a first sharer field, the first sharer field comprising a first bit that corresponds to the first core identifier and a second bit that corresponds to the second core identifier, wherein the first entry is associated with a memory block cached by the multi-core processor. The method may further comprise setting the first bit to a first value, wherein the first value indicates that the memory block is cached by the first core, and setting the second bit to a second value, wherein the second value indicates that the memory block is cached by the second core.

A system may comprise a first core of a processor operable up to a first frequency and a second core of the processor operable up to the first frequency. The system may further comprise a cache coherence component coupled to the first and second cores and configured at least to access a first bit-to-cache map, wherein the first bit-to-cache map comprises a first core identifier that corresponds to the first core and a second core identifier that corresponds to the second core. The cache coherence component may be further configured at least to maintain one or more entries in a first directory, a first entry of the one or more entries comprising a first sharer field, the first sharer field comprising a first bit that corresponds to the first core identifier and a second bit that corresponds to the second core identifier, wherein the first entry is associated with a memory block cache by the processor. The cache coherence component may be further configured at least to set the first bit to a first value, wherein the first value indicates that the memory block is cached by the first core, and set the second bit to a second value, wherein the second value indicates that the memory block is cached by the second core.

The foregoing summary is illustrative only and should not be construed in any way to be limiting. In addition to the illustrative aspects, embodiments, and features described above, further aspects, embodiments, and features will become apparent by reference to the drawings and the following detailed description.

BRIEF DESCRIPTION OF THE FIGURES

The foregoing and other features of this disclosure will become more fully apparent from the following description and appended claims, taken in conjunction with the accompanying drawings. Understanding that these drawings depict only several embodiments in accordance with the disclosure and are therefore not to be considered limiting of its scope, the disclosure will be described with additional specificity and detail through use of the accompanying drawings.

Figure 1:
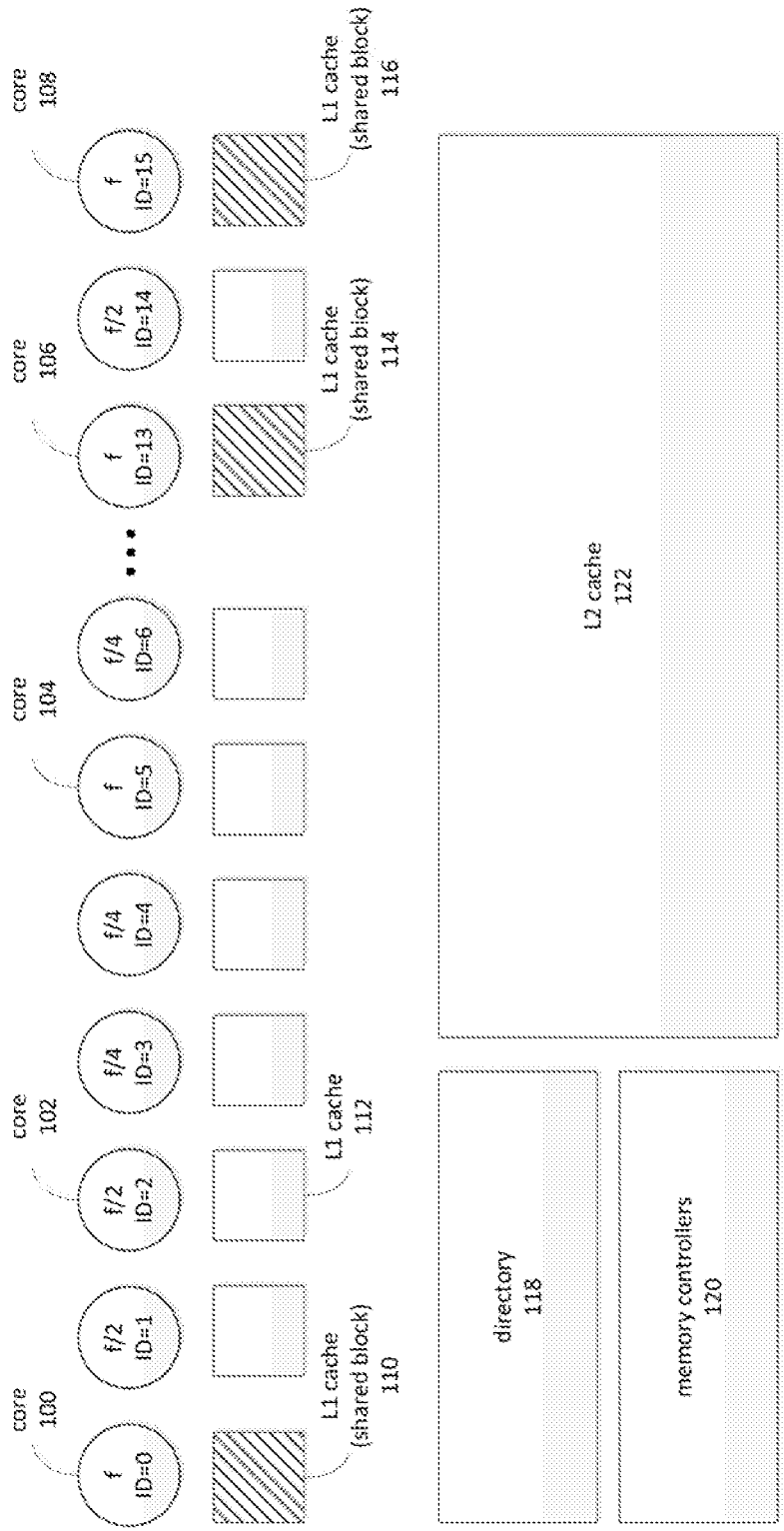
FIG. 1 is a block diagram depicting an embodiment of a multicore processor system having cores operating at mixed frequencies and employing a cache coherence directory consistent with aspects of the present disclosure.

All of the above are arranged according to at least some embodiments presented herein.

DETAILED DESCRIPTION

In the following detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be utilized, and other changes may be made, without departing from the spirit or scope of the subject matter presented herein. The aspects of the present disclosure, as generally described herein, and illustrated in the Figures, can be arranged, substituted, combined, separated, and designed in a wide variety of different configurations, all of which are explicitly contemplated herein.

This disclosure is generally drawn, inter alia, to methods, apparatus, systems, devices, and computer program products related to maintenance of a cache coherence directory. Briefly stated, a cache coherence mechanism may comprise a bit-to-cache map for processor cores operable up to a maximum frequency for cores of a multicore processor. Entries in a cache coherence directory may include a bit field identifying cores operable at or near a maximum frequency that shares a memory block corresponding to the entry. An additional field may indicate sharing by cores operating at lower frequencies. The additional field may be indicative of the bit-field corresponding to a bit-to-cache map representative of cores other than those operating at or near the maximum frequency.

The cores or thread contexts of a multicore processor may be configured to operate at near-threshold voltage in order to improve energy efficiency. Manufacturing variations and other factors may cause the threshold voltage of the cores to vary. As a result, the maximum operating frequency of the cores may also vary. The maximum operating frequency at which a core can run may depend on voltage drive, e.g. the difference between supply voltage and threshold voltage. In some embodiments, cores of a multicore processor may be stepped to run at various frequency levels, such as full-frequency, half-frequency, and quarter-frequency. These frequencies may be designated as f, f/2, and f/4, respectively.

FIG. 1 is a block diagram depicting an embodiment of a multicore processor system having cores operating at mixed frequencies and employing a cache coherence directory consistent with aspects of the present disclosure. More specifically, FIG. 1 depicts an example of a multicore processor comprised of cores 100-108 operating at mixed frequencies f, f/2, and f/4. In the depicted example, core 100 may operate at a maximum frequency of f, while core 102 may operate at a maximum frequency of f/2. Other cores may run at a maximum frequency of f/4. The number of cores having a given maximum operating frequency may vary based on manufacturing variations and other factors. Which cores are able to operate at frequencies f, f/2, f/4 and so on may not be known at design-time.

Each core may be associated with a level 1 ("L1") cache. In the example depicted by FIG. 1, core 100 may be associated with L1 cache 110, core 102 may be associated with L1 cache 112, and so on. An L1 cache may comprise a memory storing data and instructions recently accessed by an associated core. The L1 cache may be described as a private cache, because it may only cache data accessed by its associated core. Data in an L1 cache may be organized into blocks that may contain copies of corresponding blocks of memory stored elsewhere, such as in a level 2 ("L2") cache 122 or in another memory communicatively coupled to the multicore processor. Multiple L1 caches may store copies of the same block of memory. For example, FIG. 1 depicts L1 caches 110, 114, and 116 as each containing a copy of the same block of memory.

A directory 118 may be integrated as an element of the multicore processor, or may also be embodied in whole or in part in other hardware or software, including software such as a device driver or operating system. Embodiments may utilize directory 118 as an element of maintaining cache coherency, which may involve maintaining a consistent view of shared data in private and shared caches, such as L1 and L2 caches. In some embodiments, L1 and L2 caches may be private per core, while an L3 (or an L4) cache may be shared by more than one core. Various other cache hierarchies may be utilized in various embodiments. The directory 118 may keep track of the coherence state of each memory block held in cache. One or more memory controllers 120 may coordinate loading and maintaining transfer of data between, for example, main memory of the system and private and shared caches. The various components (e.g., cores 100-108, caches 110-116 and 122, directory 118, memory controllers 120, etc.) may be operatively coupled to each other.

Embodiments may prioritize higher-frequency cores over lower-frequency cores for thread scheduling. Because embodiments may utilize constant supply voltages across all cores, power consumption and instruction throughput characteristics may depend on clock frequency. Higher-frequency cores may be more energy efficient than lower-frequency cores due to factors such as finishing instructions sooner and providing more opportunities for power gating other chip components. Power-gating policies may, for similar reasons, prioritize a selection of lower-frequency cores. A power-gating policy may, for example, group cores and their associated caches into groups according to operating frequency. For example, all cores operating at frequency f may be associated with a first power gating group, while all cores operating at frequency f/2 could be grouped into a second power gating group. Embodiments may utilize various other groupings and subgroupings. When a system is operating under high load, all power gating groups may be enabled. When the system is operating under a lighter load, lower-frequency power gating groups may be disabled while higher-frequency groups may be enabled.

Figure 2:
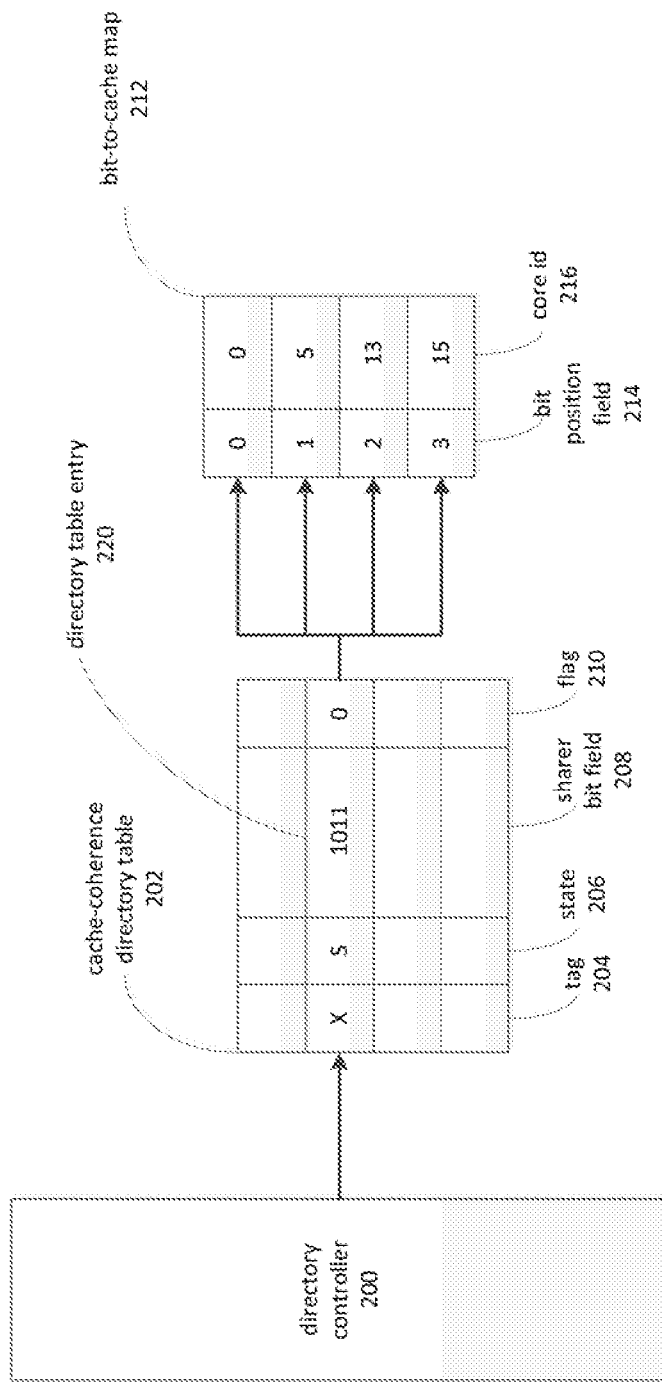
FIG. 2 is a block diagram depicting an embodiment of a cache coherence directory consistent with aspects of the present disclosure.

In various embodiments, greater data sharing may occur between higher frequency cores than occurs between lower-frequency cores, or than occurs between cores of different frequencies. A scalable directory coherence structure with accurate directory information but nevertheless possessing relatively low storage overhead may be employed, and may be tailored or otherwise configured to operate according to the aforementioned sharing pattern. FIG. 2 is a block diagram depicting an embodiment of a cache coherence directory consistent with aspects of the present disclosure, and more specifically, FIG. 2 depicts an embodiment of a scalable directory coherence structure. A directory controller 200 may access and maintain a cache-coherence directory table 202 coupled to the directory controller 200. The directory table 202 may be comprised of various fields, examples of which are depicted in FIG. 2. The fields tag 204 and state 206 may reflect a coherence state of a block of memory associated with an entry of directory table 202.

Embodiments may employ a sharer bit field 208 in entries of directory table 202 to track cores sharing a memory block. The size of sharer bit field 208 may be equivalent or proportional or otherwise related to the number of cores expected or determined to operate within a maximum frequency band, such as the cores operating at frequency f depicted in FIG. 1. The sharer bit field 208 may contain one bit for each core to be represented. Although described herein as a bit field, various other representations may also be employed. In some embodiments, the sharer bit field 208 may be combined with other fields or structures.

Various diagnostic, test, or self-test procedures performed after manufacturing may be employed to determine the operating frequencies of the various cores. Also, a probability distribution of the threshold voltages may be based on theoretical and/or experimental data. From this distribution, an expected range of cores operating at each frequency may be predicted. In various embodiments, the number of bits in bit sharer field 208, or more generally the size of bit sharer field 208, may be based on a statistical distribution of maximum operating frequencies for cores on other microprocessors, e.g. those cores whose operating frequencies have been measured experimentally. The number of bits in bit sharer field 208 may be configured based at least in part on a number of cores operable up to the first frequency, or based at least in part on a number of cores predicted to be operable up to the first frequency. The number of cores predicted to be operable up to the first frequency may be based at least in part on a statistical distribution of maximum operating frequencies of other multicore processors, such as those that have been measured experimentally.

In some embodiments, the size of a sharer bit field 208 may be predetermined based on various information concerning distribution of threshold voltages and corresponding maximum operating frequencies. Factors that may be considered include, for example, theoretical distribution of threshold voltages, experimental data, manufacturing data, testing data, intuition, and so forth. Other embodiments may base the size of a sharer bit field on information obtained during system startup, configuration, or initialization. For example, the number of cores may be determined based on diagnostic or self-test procedures, retrieved from programmable read-only memory, and so on, and then applied to configure a bit sharer field size. In some embodiments, a size for sharer bit field 208 may be based on additional factors such as favoring a compact directory coherence structure, improving execution speed, and so on. In some cases, there may be more or fewer cores operating within a maximum frequency band than can be represented by bits in the sharer bit field. In some embodiments, the bit sharer field may be configured with a size determined based on the factors described above during system startup, configuration, or initialization.

Referring again to the example of FIG. 1, cores 100, 104, 106, and 108 are depicted as operating within frequency band f, while cores 100, 106, and 108 are associated with corresponding caches 110, 114, and 116 sharing a block of data. In FIG. 2, a value of 1011 for sharer bit field 208 may be used to indicate that these cores/caches share a memory block. A bit in sharer bit field 208 may correspond to an entry in bit-to-cache map 212. For example, the bits in different bit positions in the sequence 1011 may correspond to the entries in bit-to-cache 212. Embodiments may then determine that the cores corresponding to core ID=0, ID=5, and ID=15 each share a memory block represented by a directory table entry 220. In general, there may be a one-to-one correspondence between cores and L1 caches. Accordingly, a bit-to-cache map may be usually equivalent to a bit-to-core map. However, the techniques disclosed herein may be readily adapted for cases where there is not a one-to-one correspondence between a core and an L1 cache.

Embodiments may employ a bit-to-cache map 212 to map from bit positions in sharer bit field 208 to information identifying a core. For example, bit-to-cache map 212 may comprise a bit position 214 field and a field for a cache or core id 216. Various other embodiments may be employed. For example, some embodiments may omit bit position field 214, utilize memory pointers or offsets in place of the field for the core id 216, and so on.

Embodiments may populate bit-to-cache map 212 at various stages. Embodiments may, for example, populate bit-to-cache map 212 during at least one of configuration of the multicore processor, initialization of a computing system comprising the multicore processor and so forth. Configuration of the processor may comprise storing information in ROM, PROM, EEPROM, flash memory, or other memory technology.

The directory table entry 220 may also comprise a flag 210, which may provide an indication that additional cores, not represented by sharer bit field 208, are sharing a memory block represented by the entry. The use of flag 210 may not precisely indicate which of cores are sharing a memory block corresponding to directory table entry 220. However, sharer bit field 208 may be used to identify cores/caches sharing a memory block in what may be the most common case of sharing among high-frequency cores. Flag 210 may be set to a first value to indicate that caches/cores in addition to those represented by sharer bit field 208 are sharing a memory block corresponding to directory table entry 220, and to a second value, such as zero, to indicate that no cores not represented by sharer bit field 208 are sharing the memory block.

Figure 3:
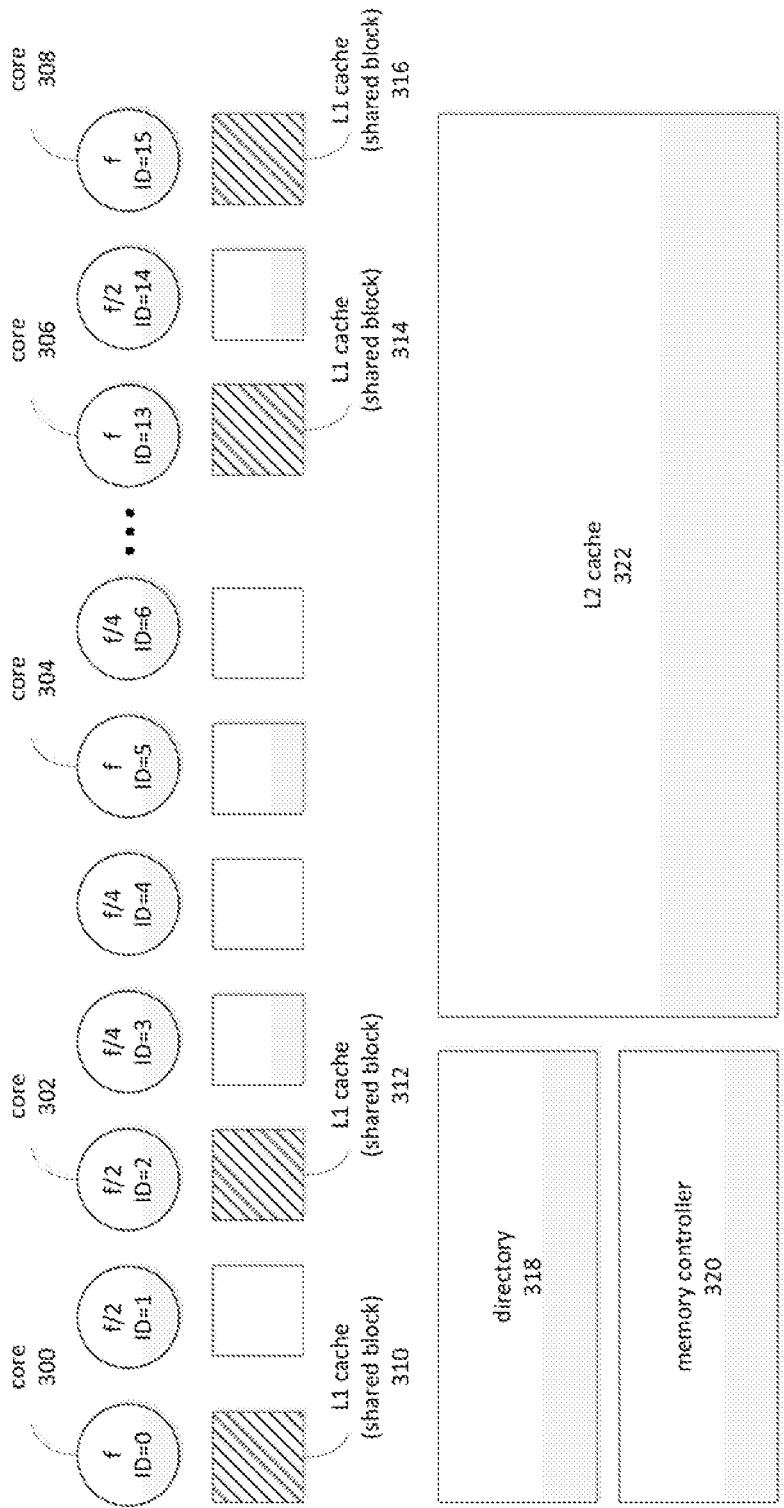
FIG. 3 is a block diagram depicting a further embodiment of a multicore processor system having cores operating at mixed frequency and employing a cache coherence directory consistent with aspects of the present disclosure.

FIG. 3 is a block diagram depicting a further embodiment of a multicore processor system having cores operating at mixed frequency and employing a cache coherence directory consistent with aspects of the present disclosure. More specifically, FIG. 3 depicts an example of a multicore processor in which caches/cores in addition to those operating within frequency band f share a block of memory. In the depicted example, cores 300, 306, and 308 and corresponding caches 310, 314, and 316 each may share a memory block. Cores 300, 306, and 308 are depicted as operating at frequency f. In addition, core 302 and cache 312 may share the same block, although core 302 may operate within a reduced frequency band f/2. Referring to FIG. 2, flag 210 could be set to indicate that core 302 and cache 312 shares the memory block with other cores and caches. A directory 318 and a memory controller 320 may house and maintain directory information in a manner consistent with the present disclosure. An L2 cache 322 may be shared by multiple cores and corresponding L1 caches.

Figure 4:
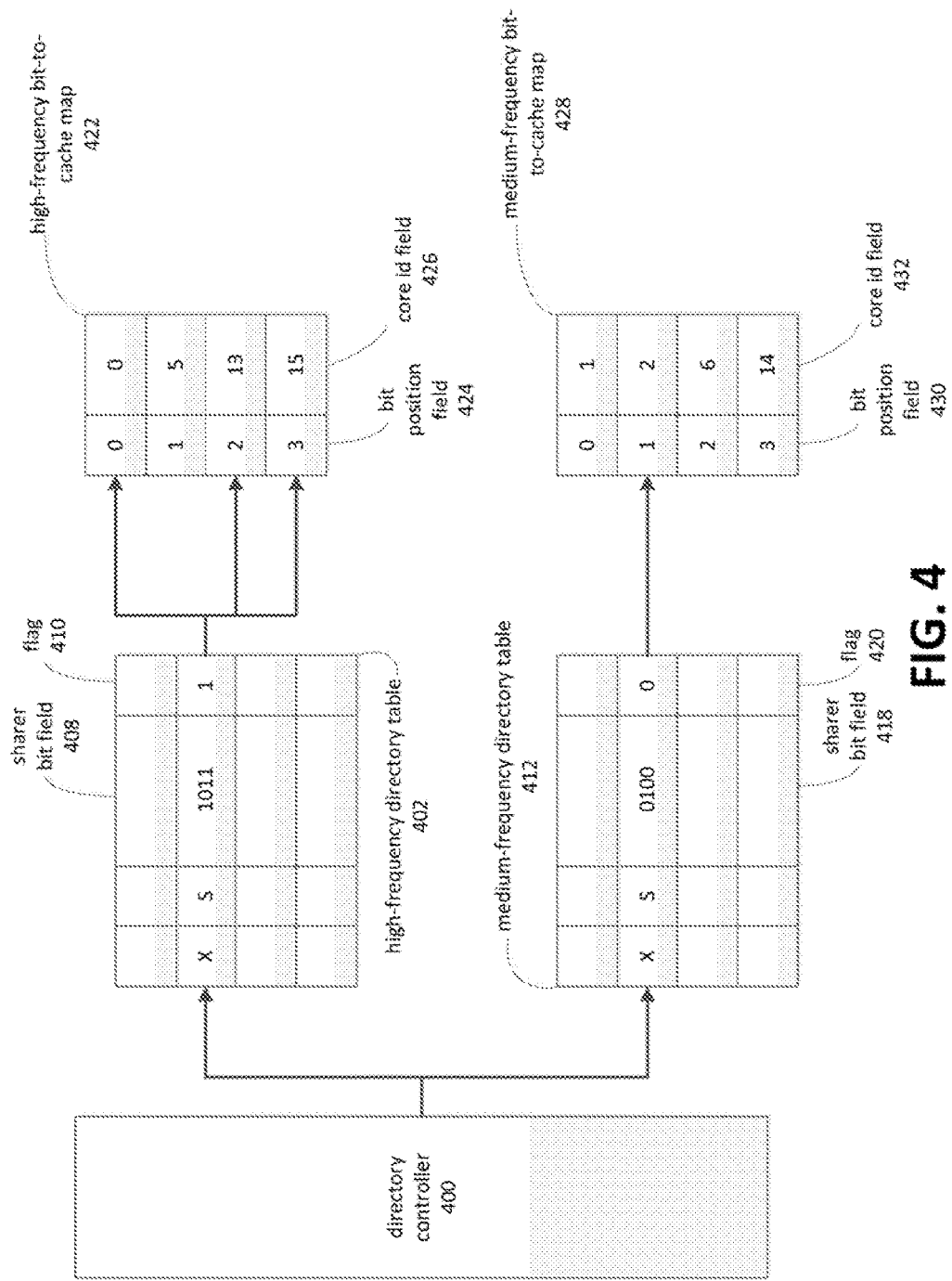
FIG. 4 is a block diagram depicting a further embodiment of a cache coherence directory consistent with aspects of the present disclosure.

FIG. 4 is a block diagram depicting a further embodiment of a cache coherence directory consistent with aspects of the present disclosure. More specifically, FIG. 4 depicts another example of an embodiment for identifying cores/caches sharing a memory block. A directory controller 400 may access one or more directory state tables, such as high-frequency directory table 402 and medium-frequency directory table 412. Additional directory tables could also be employed to track sharing data for lower frequency cores/caches. A sharer bit field in each directory table, such as sharer bit field 408 in high-frequency directory table 402, may refer to a corresponding bit-to-cache map, such as a high-frequency bit-to-cache map 422.

Referring to the example of FIG. 3, high-frequency cores 300, 306, and 308 and corresponding caches 310, 314, and 316 may share a memory block with medium-frequency core 302 and corresponding cache 312. In FIG. 4, in high-frequency directory table 402, sharer bit field 408 may be set to indicate that high-frequency cores having ID=0, ID=13, and ID=15 share a memory block, while other cores such as core 304 do not share the same block. Embodiments may identify high-frequency cores sharing a memory block based on the value of sharer bit field 408 and fields in high-frequency bit-to-cache map 422, which may in some embodiments comprise bit position field 424, and core id field 426. Similarly, in medium-frequency directory table 412, sharer bit field 418 may be set to a value indicating that a medium-frequency core corresponding to core ID=2 shares the same memory block, by reference to a medium-frequency bit-to-cache map 428. Embodiments may identify medium-frequency cores based on sharer bit field 418, bit position field 430, and core id field 432.

In high-frequency directory table 402, a flag 410 may be used to indicate that a lower-frequency core shares a memory block with the higher-frequency cores represented in the table. In the present example, flag 410 may be set to true to indicate that a medium-frequency core shares the same memory block. A flag, such as a flag 420 in medium-frequency directory table 412, may also be employed to indicate that at least one core not represented in a sharer bit field is sharing a memory block.

Figure 5:
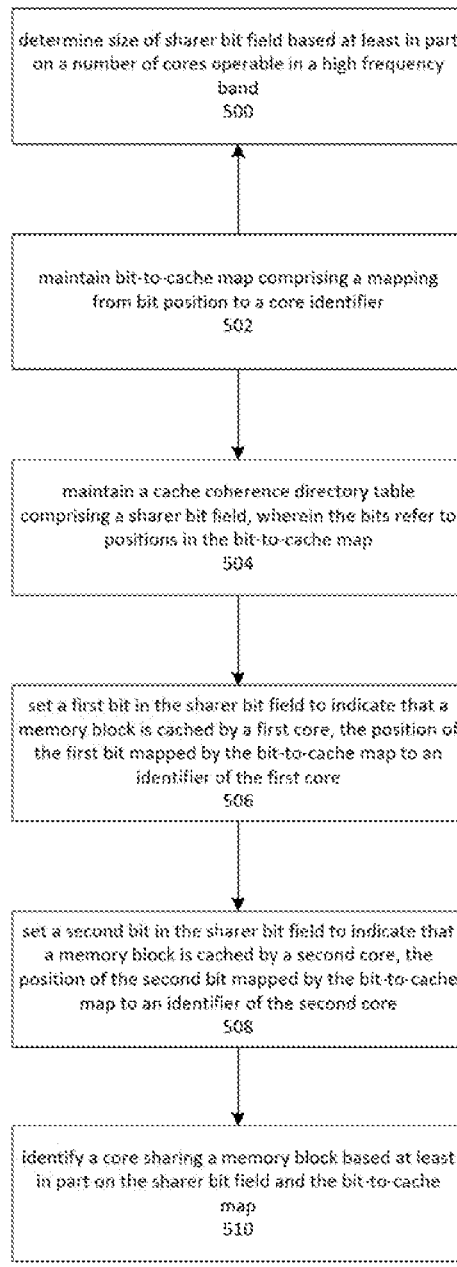
FIG. 5 is a flowchart depicting an embodiment of a process, consistent with aspects of the present disclosure, to maintain cache coherency on a multicore processor having cores operating at mixed frequencies.

FIG. 5 is a flowchart depicting an embodiment of a process, consistent with aspects of the present disclosure, to maintain cache coherency on a multicore processor having cores operating at mixed frequencies. Although depicted as a series of operations, the depicted order is intended to be illustrative, and in various embodiments at least some of the depicted operations may be altered, omitted, reordered, supplemented with additional operations, combined, and/or performed in parallel.

Block 500 ("determine size of sharer bit field based at least in part on a number of cores operable in a high frequency band") depicts determining (by a cache coherence component, for example) the size of a sharer bit field based at least in part on a number of cores operable in a high frequency band. In some embodiments, a predetermined value may be retrieved upon system startup, while yet other embodiments may utilize a fixed value based on theoretical or experimental data. Various additional approaches to determine an expected or actual number of cores operating at a given frequency are possible.

Block 502 ("maintain bit-to-cache map comprising a mapping from bit position to a core identifier") may follow block 500 and depicts maintaining (by a cache coherence component, for example) a bit-to-cache map comprising a mapping from a bit position to information identifying a core and/or cache. Some embodiments may construct the bit-to-cache map upon system startup, while others may store a pre-initialized map in a memory such as programmable read-only memory, on-chip memory, encoded in instructions of the operating system, and so forth.

Block 504 ("maintain a cache coherence directory table comprising a sharer bit field, wherein the bits refer to positions in the bit-to-cache map") may follow block 502. As depicted by block 504, embodiments may maintain, by a cache coherence component, for example, a cache coherence directory table comprising a sharer bit field. Bits in the sharer bit field may refer to corresponding positions in a bit-to-cache mapping table. A bit in the sharer bit field may be set to indicate that a block of memory is cached by a core whose identifier is located in a corresponding position in the bit-to-cache/bit-to-code map. This is depicted by block 506 ("set a first bit in the sharer bit field to indicate that a memory block is cached by a first core, the position of the first bit mapped by the bit-to-cache map to an identifier of the first core"), which may follow block 504 and may, for example, be performed by a cache coherence component. Similarly, as depicted by block 508 ("set a second bit in the sharer bit field to indicate that a memory block is cached by a second core, the position of the second bit mapped by the bit-to-cache map to an identifier of the second core"), which may follow block 506, additional bits may be set in the sharer bit field to indicate which other cores share the memory block in their own respective caches. This may be done, for example, by a cache coherence component. Block 510 ("identify a core sharing a memory block based at least in part on the sharer bit field and the bit-to-cache map"), which may follow block 508, depicts identifying (by a cache coherence component, for example) a core sharing a memory block based at least in part on the position of a bit set in a sharer bit field and a corresponding position in a bit-to-cache mapping table.

Figure 6:
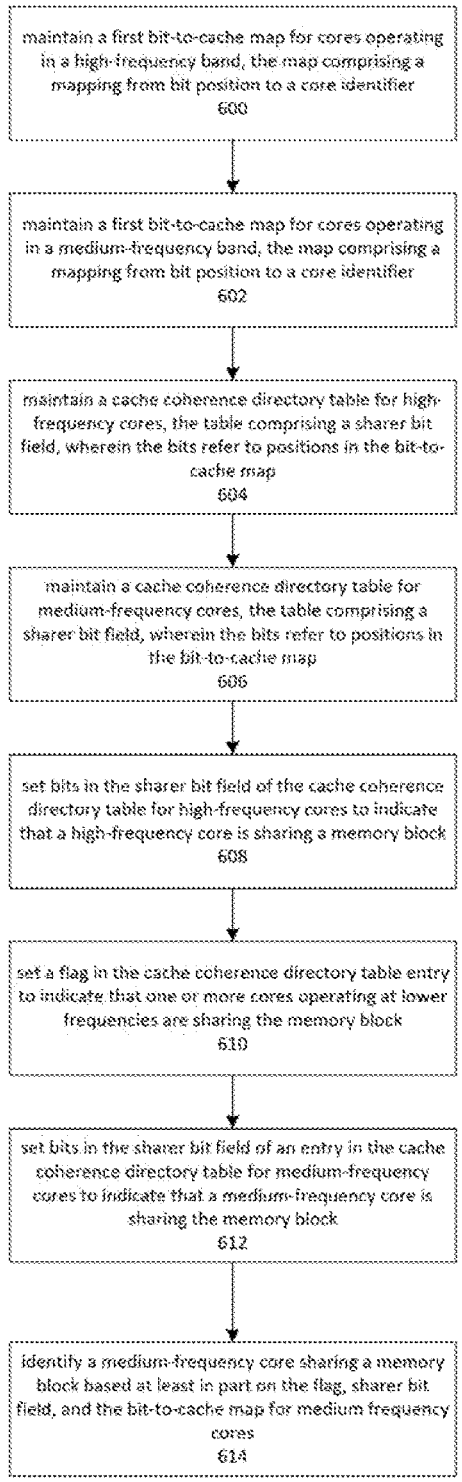
FIG. 6 is a flowchart depicting a further embodiment of a process, consistent with aspects of the present disclosure, to maintain cache coherency on a multicore processor having cores operating at mixed frequencies, the depicted process employing bit-to-cache maps grouped by operating frequency.

FIG. 6 is a flowchart depicting a further embodiment of a process, consistent with aspects of the present disclosure, to maintain cache coherency on a multicore processor having cores operating at mixed frequencies, the depicted process employing bit-to-cache maps grouped by operating frequency. Specifically, FIG. 6 depicts a further embodiment of a process to maintain a cache coherency directory structure using a plurality of directory table structures, each corresponding to cores grouped by operating frequency. Although depicted as a series of operations, the depicted order of operations is intended to be illustrative, and in various embodiments at least some of the depicted operations may be altered, omitted, reordered, supplemented with additional operations, combined, and/or performed in parallel.

As depicted by blocks 600 ("maintain a first bit-to-cache map for cores operating in a high-frequency band, the map comprising a mapping from bit position to a core identifier") and 602 ("maintain a first bit-to-cache map for cores operating in a medium-frequency band, the map comprising a mapping front bit position to a core identifier"), embodiments may maintain (by a cache coherence component, for example) a plurality of bit-to-cache maps, each bit to cache map representing cores grouped by frequency band. In various cases and embodiments, cores operating in a higher frequency band may be represented in a bit-to-cache map that is also representing cores operating in lower frequencies. For example, a first bit-to-cache map might only contain entries representing high-frequency cores. A second bit-to-cache map might primarily contain entries representing medium-frequency cores, but also contain a number of entries corresponding to high-frequency cores. This situation could occur, for example, if a greater number of high-frequency cores were present on the chip than was expected based on typical manufacturing variances.

Blocks 604 ("maintain a cache coherence directory table for high-frequency cores, the table comprising a sharer bit field, wherein the bits refer to positions in the bit-to-cache map") and 606 ("maintain a cache coherence directory table for medium-frequency cores, the table comprising a sharer bit field, wherein the bits refer to positions in the bit-to-cache map") represent maintaining (by a cache coherence component, for example) a plurality of cache coherence directory tables. Embodiments may maintain a high-frequency directory table and a medium-frequency directory table. A high-frequency directory table may contain entries with sharer bit fields corresponding to a bit-to-cache map representative of high-frequency cores. A medium-frequency directory table may contain entries with sharer bit fields corresponding to a bit-to-cache map representative of medium frequency cores. In various cases and embodiments, cores of mixed frequency may be represented.

Sharing of a memory block may be recorded, as depicted by block 608 ("set bits in the sharer bit field of the cache coherence directory table for high-frequency cores to indicate that a high-frequency core is sharing a memory block"), by setting bits in an entry's sharer bit field. This may, for example, be done by a cache coherence component. For example, the sharer bit field for an entry in a high-frequency directory table may be set to indicate that a high-frequency core is sharing a memory block corresponding to the entry.

Block 610 ("set a flag in the cache coherence directory table entry to indicate that one or more cores operating at lower frequencies are sharing the memory block") depicts setting (by a cache coherence component, for example) a flag in an entry of a directory table to indicate that the memory block is shared by one or more lower-frequency cores, or cores not otherwise represented in the high-frequency directory table. Embodiments may utilize the flag to determine to refer to a directory table corresponding to a lower frequency level. For example, an entry in a high-frequency directory might contain a flag indicating that at least one medium-frequency core is also sharing a memory block corresponding to the entry.

Embodiments may, for example by a cache coherence component, record sharing of a memory block by a medium frequency core by setting bits in the corresponding sharer bit field of a medium-frequency directory table, as depicted by block 612 ("set bits in the sharer bit field of an entry in the cache coherence directory table for medium-frequency cores to indicate that a medium-frequency core is sharing the memory block").

A high-frequency core sharing a memory block may be identified based on the high-frequency directory table, the entry corresponding to the memory block and on mapping from a bit position in a bit sharer field to a core identifier contained in a high-frequency bit-to-cache map. As medium frequency core sharing a memory block may be identified, as depicted by block 614 ("identify a medium-frequency core sharing a memory block based at least in part on the flag, sharer bit field, and the bit-to-cache map for medium frequency cores"), by examining the flag in the high-frequency directory table and then using a bit sharer field in the medium-frequency directory table and the corresponding bit-to-cache map. The identification may be performed by a cache coherence component, for example.

In an embodiment, an additional bit-to-cache map may be maintained, the map comprising entries for a core identifier operable at a frequency that is less than the high frequency. Embodiments may maintain an entry in an additional directory, wherein the entry comprises a bit that corresponds to the core identifier for the core that operable at less than high frequency. Embodiments may set the bit to a value indicative of a memory block being cached by the core.

Figure 7A:
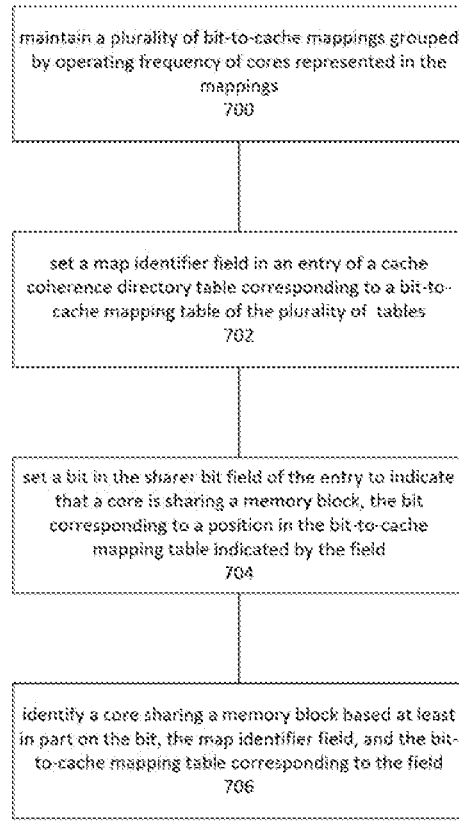
FIG. 7A is a flowchart depicting a further embodiment of a process, consistent with aspects of the present disclosure, to maintain cache coherency on a multicore processor having cores operating at mixed frequencies, the depicted process employing a combined cache coherence directory.

In another embodiment, a single directory coherence table may be employed in conjunction with a plurality of bit-to-cache map. For example, an embodiment might employ a high-frequency bit-to-cache map, a medium-frequency bit-to-cache map, and a low-frequency bit to cache map. FIG. 7A is a flowchart depicting a further embodiment of a process, consistent with aspects of the present disclosure, to maintain cache coherency on a multicore processor having cores operating at mixed frequencies, the depicted process employing a combined cache coherence directory. More specifically, FIG. 7A depicts an embodiment of a process to maintain a cache coherency directory structure using one directory table structure and a plurality of bit-to-cache maps, each map corresponding to cores grouped by operating frequency. Although depicted as a series of operations, the depicted order of operations is intended to be illustrative, and in various embodiments at least some of the depicted operations may be altered, omitted, reordered, supplemented with additional operations, combined, and/or performed in parallel.

Block 700 ("maintain a plurality of bit-to-cache mappings grouped by operating frequency of cores represented in the mappings") depicts maintaining (by a cache coherence component, for example) a plurality of bit-to-cache maps grouped by the operating frequency of cores represented by the maps. Each bit-to-cache map may be associated with a map identifier, which could include binary identifiers, numeric identifiers, and so on. These may be depicted as "H," "M," and "L," which could correspond to high-frequency, medium-frequency, and low-frequency bit-to-cache maps, respectively. Block 702 ("set a map identifier field in an entry of a cache coherence directory table corresponding to a bit-to-cache mapping table of the plurality of tables") depicts setting (by a cache coherence component, for example) a map identifier field in an entry of a directory table to an identifier corresponding to a bit-to-cache mapping table. As depicted by block 704 ("set a bit in the sharer bit field of the entry to indicate that a core is sharing a memory block, the bit corresponding to a position in the bit-to-cache mapping table indicated by the field"), bits in an entry's sharer bit field may be set (by a cache coherence component, for example) to indicate that a core is sharing a memory block corresponding to the entry. The position of the bit may correspond to an entry in the bit-to-cache mapping table corresponding to the value of the field. For example, if the map identifier field were set to "M," the bits of the bit sharer field could correspond to entries in a medium-frequency bit-to-cache map.

Embodiments may, as depicted by block 706 ("identify a core sharing a memory block based at least in part on the bit, the map identifier field, and the bit-to-cache mapping table corresponding to the field"), identify a core sharing a memory block based at least in part on a bit set in a sharer bit field, a map identifier field, and a bit-to-cache map corresponding to the map identifier field. The identification may be done by a cache coherence component, for example.

Figure 7B:
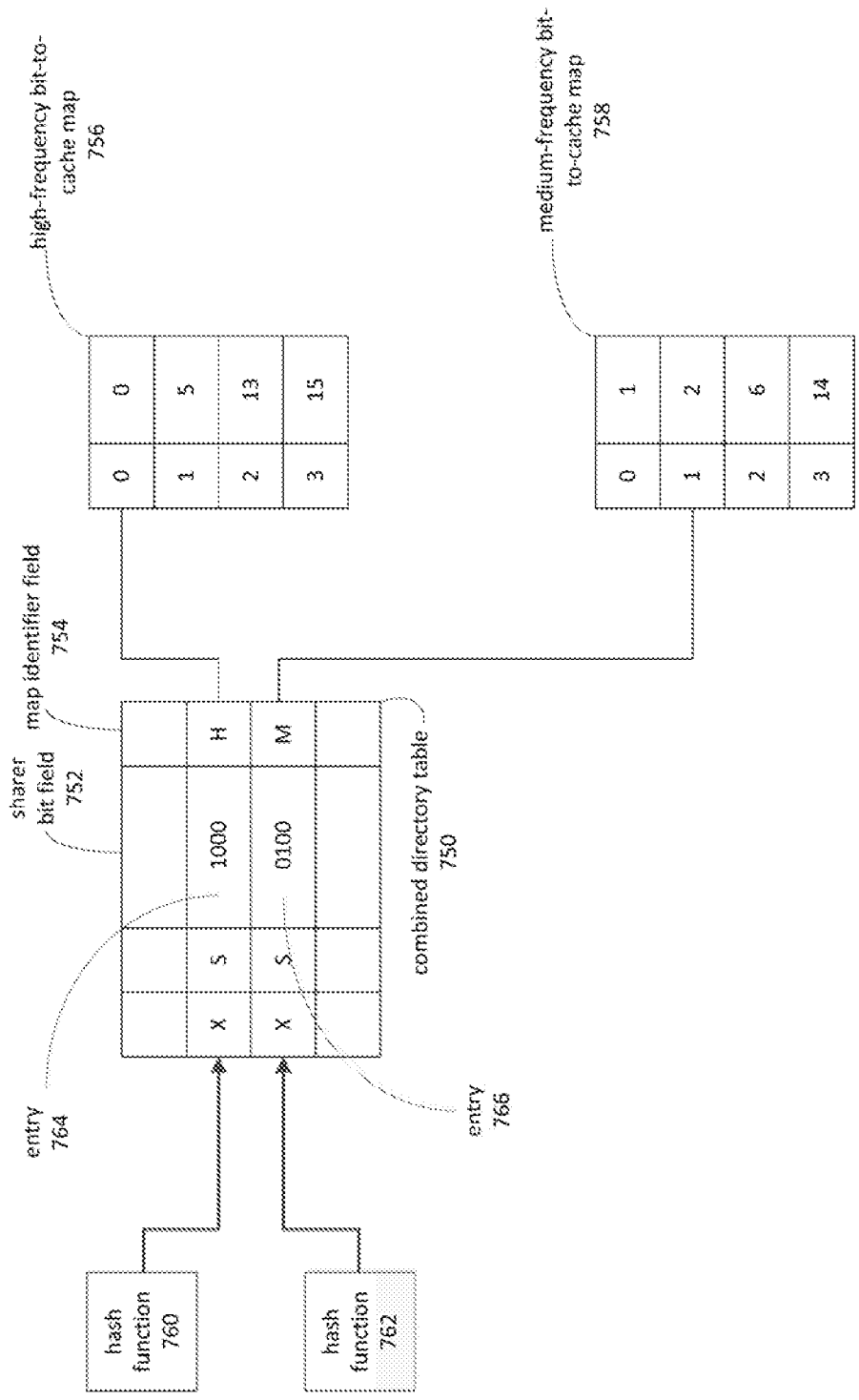
FIG. 7B is a diagram depicting an embodiment of a combined cache coherence directory.

FIG. 7B is a diagram depicting an embodiment of a combined cache coherence directory. More specifically, FIG. 7B is a block diagram depicting a combined directory structure, and may be referred to as an example of identifying a shared memory block using combined directory table 750. Some embodiments may employ hash functions 760 and 762 to lookup locations of directory entries corresponding to a memory block. In the example of FIG. 7B, this could refer to entries 764 and 766. For entry 764, a map identifier field 754 may indicate that sharer bit field 752 corresponds to high-frequency bit-to-cache map 756. Similarly, for entry 766, map identifier field 754 may indicate medium-frequency bit-to-cache map 758 corresponds to the entry's sharer bit field 752.

In an embodiment, an additional bit-to-cache map may be maintained. The additional bit-to-cache map may comprise a core identifier corresponding to a core operable at a frequency less than the high frequency. A field in a cache-coherence directory entry may be set, the field being indicative of the sharer bit field corresponding to the additional bit-to-cache map. Embodiments may determine that a memory block is cached by a core operable at less than the highest frequency based at least in part on the sharer bit field and identify the core based at least in part on the additional bit-to-cache map.

Embodiments may be applied to processor architectures in addition to those that employ near-threshold voltage design. For example, a processor, whether or not it utilizes a near-threshold voltage design, might prioritize certain cores for entering a sleep state. Embodiments of the present disclosure might be employed to represent the cores least likely to enter a sleep state in a bit-to-cache mapping table.

The foregoing detailed description has set forth various embodiments of the devices and/or processes via the use of block diagrams, flowcharts, and/or examples. Insofar as such block diagrams, flowcharts, and/or examples contain one or more functions and/or operations, each function and/or operation within such block diagrams, flowcharts, or examples can be implemented, individually and/or collectively, by a wide range of hardware, software, firmware, or virtually any combination thereof. In one embodiment, several portions of the subject matter described herein may be implemented via Application Specific Integrated Circuits (ASICs), Field Programmable Gate Arrays (FPGAs), digital signal processors (DSPs), or other integrated formats. However, some aspects of the embodiments disclosed herein, in whole or in part, can be equivalently implemented in integrated circuits, as one or more computer programs running on one or more computers e.g., as one or more programs running on one or more computer systems), as one or more programs running on one or more processors (e.g., as one or more programs running on one or more processors), as firmware, or as virtually any combination thereof, and that designing the circuitry and/or writing the code for the software and or firmware are possible in light of this disclosure. In addition, the mechanisms of the subject matter described herein are capable of being distributed, as a program product in a variety of forms, and that an illustrative embodiment of the subject matter described herein applies regardless of the particular type of signal bearing medium used to actually carry out the distribution. Examples of a signal bearing medium include, but are not limited to, the following: a recordable type medium such as a floppy disk, a hard disk drive, a CD, a DVD, a digital tape, a computer memory, and a transmission type medium such as a digital and/or an analog communication medium (e.g., a fiber optic cable, a waveguide, a wired communications link, a wireless communication link, etc.).

Those skilled in the art will recognize that it is common within the art to describe devices and/or processes in the fashion set forth herein, and thereafter use engineering practices to integrate such described devices and/or processes into data processing systems. That is, at least a portion of the devices and/or processes described herein can be integrated into a data processing system via a reasonable amount of experimentation. Those having skill in the art will recognize that a typical data processing system generally includes one or more of a system unit housing, a video display device, a memory such as volatile and non-volatile memory, processors such as processors and digital signal processors, computational entities such as operating systems, drivers, graphical user interfaces, and applications programs, one or more interaction devices, such as a touch pad or screen, and/or control systems including feedback loops and control motors (e.g., feedback for sensing position and/or velocity; control motors for moving and/or adjusting components and/or quantities). A typical data processing system may be implemented utilizing any suitable commercially available components, such as those typically found in data computing/communication and/or network computing/communication systems.

The herein described subject matter sometimes illustrates different components contained within, or connected with, other different components. Such depicted architectures are merely examples, and that, in fact, many other architectures can be implemented to achieve the same functionality. In a conceptual sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected"—or "operably coupled"—to each other to achieve the desired functionality, and any two components capable of being so associated can also be viewed as being "operably couplable" to each other to achieve the desired functionality. Specific examples of operably couplable include, but are not limited to, physically mateable and/or physically interacting components and/or wirelessly interactable and/or wirelessly interacting components and/or logically interacting and/or logically interactable components.

Figure 8:
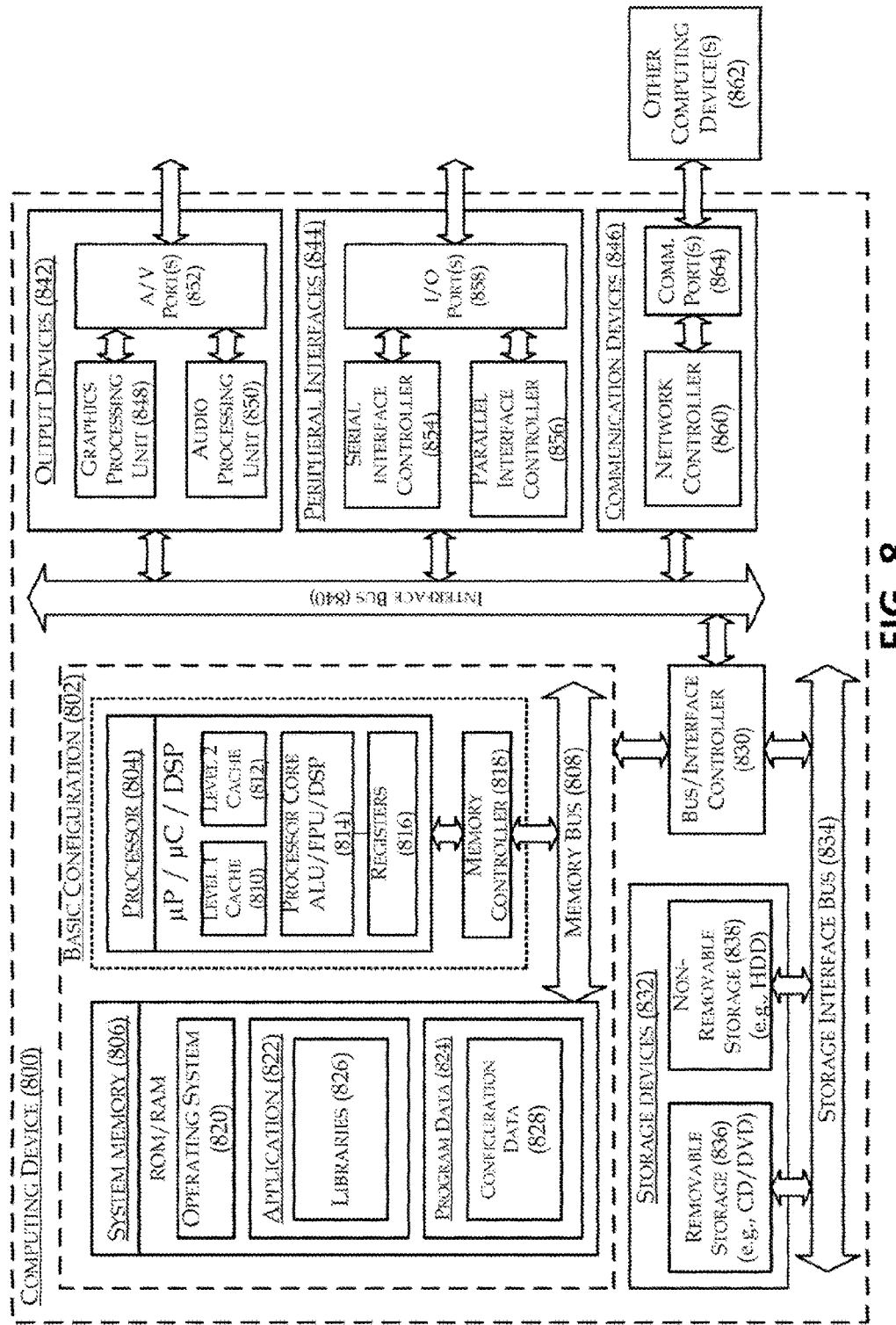
FIG. 8 is a block diagram depicting an example computing system wherein aspects of the present disclosure can be implemented.

FIG. 8 is a block diagram depicting an example computing system wherein aspects of the present disclosure can be implemented. In particular, FIG. 8 depicts a block diagram illustrating an example computing device 800. In a very basic configuration 802, computing device 800 typically includes one or more processors 804 and a system memory 806. A memory bus 808 may be used for communicating between processor 804 and system memory 806.

Depending on the desired configuration, processor 804 may be of any type including but not limited to a microprocessor (μP), a microcontroller (μC), a digital signal processor (DSP), or any combination thereof. Processor 804 may include one or more levels of caching, such as a level one cache 810 and a level two cache 812, a processor core 814, and registers 816. An example processor core 814 may include an arithmetic logic unit (ALU), a floating point unit (FPU), a digital signal processing core (DSP Core), or any combination thereof. An example memory controller 818 may also be used with processor 804, or in some implementations memory controller 818 may be an internal part of processor 804.

Processor 804 may be a multi-core processor, such as those previously described above. A multicore processor 804 may comprise a plurality of processor cores 814, each paired with one of a plurality of level 1 cache 810 and registers 816. The plurality of processor cores 814 may, in some embodiments, share level 2 cache 812 and memory controller 818. Numerous alternative configurations and combinations may be utilized in conjunction with the practice of various aspects of the present disclosure.

A multi-core embodiment of processor 804 may comprise a cache coherence component configured to practice aspects of the present disclosure, such as maintaining a cache coherence directory. Various aspects of the present disclosure may be practiced by memory controller 818, operating system 820, other software instruction or circuitry components, and various combinations of the preceding. These elements may be referred to as a cache coherence component. Instructions for performing aspects of the present disclosure may be stored in a memory communicatively coupled to a cache coherence component. In some embodiments, a memory containing information indicative of core operating frequencies or similar information may be communicatively coupled to a cache coherence component. This information may be utilized in configuring the size of bit sharer fields and also for initializing bit-to-cache mapping structures. Instructions to perform various aspects of the present disclosure may be embodied by computer executable instructions stored on a non-transitory computer readable storage media such as any of storages devices 832. In some embodiments, processor 804 may contain storage media containing executable instructions for practicing aspects of the present disclosure, said storage media including, for example, circuitry containing microcode instructions. In some embodiments, instructions that, in response to being executed by a processor such as processor 804, perform aspects of a cache coherence component may form elements of operation system 820 and/or an application 822 described below. In some embodiments, the instructions may wholly or partially reside "on-chip," which is to say the instructions are stored and executed by processor 804. For example, the instructions may comprise microcode executed by a component of processor 804. In some embodiments, at least some of the instructions or other aspects of a cache coherence component may be performed by an element of memory controller 818.

Depending on the desired configuration, system memory 806 may be of any type including but not limited to volatile memory (such as RAM), non-volatile memory (such as ROM, flash memory, etc.), or any combination thereof. System memory 806 may include an operating system 820, one or more applications 822, and program data 824. Application 822 may include various libraries 826 that are arranged to perform various functions or operations. Program data 824 may include configuration data 828. In some embodiments, application 822 may be arranged to operate with program data 824 on operating system 820. Application 822 may be associated with threads scheduled, for example, by operating system 820. Executing threads may cause data associated with applications 822, program data 824, or configuration data 828 to be stored in level 1 cache 810 or level 2 cache 812. This described basic configuration 802 is illustrated in FIG. 8 by those components within the inner dashed line.

Computing device 800 may have additional features or functionality and additional interfaces to facilitate communications between basic configuration 802 and any required devices and interfaces. For example, a bus/interface controller 830 may be used to facilitate communications between basic configuration 802 and one or more data storage devices 832 via a storage interface bus 834. Data storage devices 832 may be removable storage devices 836, non-removable storage devices 838, or a combination thereof. Examples of removable storage and non-removable storage devices include magnetic disk devices such as flexible disk drives and hard-disk drives (HDDs), optical disk drives such as compact disk (CD) drives or digital versatile disk (DVD) drives, solid state drives (SSDs), and tape drives to name a few. Example computer storage media may include volatile and nonvolatile and removable and non-removable media implemented in any method or technology for storage of information, such as computer readable instructions, data structures, program modules, or other data.

System memory 806, removable storage devices 836, and non-removable storage devices 838 are examples of computer storage media. Computer storage media includes, but is not limited to, RAM, ROM, PROM, EEPROM, flash memory or other memory technology, CD-ROM, digital versatile disks (DVD) or other optical storage, magnetic cassettes, magnetic tape, magnetic disk storage or other magnetic storage devices, or any other medium that may be used to store the desired information and that may be accessed by computing device 800. Any such computer storage media may be part of computing device 800.

Computing device 800 may also include an interface bus 840 to facilitate communication from various interface devices (e.g., output devices 842, peripheral interfaces 844, and communication devices 846) to basic configuration 802 via bus/interface controller 830. Example output devices 842 include a graphics processing unit 848 and an audio processing unit 850, which may be configured to communicate to various external devices such as a display or speakers via one or more A/V ports 852. Example peripheral interfaces 844 include a serial interface controller 854 or a parallel interface controller 856, which may be configured to communicate with external devices such as input devices (e.g., keyboard, mouse, pen, voice input device, touch input device, etc.) or other peripheral devices (e.g., printer, scanner, etc.) via one or more I/O ports 858. An example communication device 846 includes a network controller 860, which may be arranged to facilitate communications with one or more other computing devices 862 over a network communication link via one or more communication ports 864.

The network communication link may be one example of a communication media. Communication media may typically be embodied by computer readable instructions, data structures, program modules, or other data in a modulated data signal, such as a carrier wave or other transport mechanism, and may include any information delivery media. A modulated data signal may be a signal that has one or more of its characteristics set or changed in such a manner as to encode information in the signal. By way of example, and not limitation, communication media may include wired media such as a wired network or direct-wired connection, and wireless media such as acoustic, radio frequency (RF), microwave, infrared (IR) and other wireless media. The term computer readable media as used herein may include both storage media and communication media.

Computing device 800 may be implemented as a portion of a small-form factor portable (or mobile) electronic device such as a cell phone, a personal data assistant (PDA), a personal media player device, a wireless web-watch device, a personal headset device, an application specific device, or a hybrid device that include any of the above functions. Computing device 800 may also be implemented as a personal computer including both laptop computer and non-laptop computer configurations.

With respect to the use of substantially any plural and/or singular terms herein, those having skill in the art can translate from the plural to the singular and/or from the singular to the plural as is appropriate to the context and/or application. The various singular/plural permutations may be expressly set forth herein for the sake of clarity.

It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (e.g., "a" and/or "an" should be interpreted to mean "at least one" or "one or more"); the same holds true for the use of definite articles used to introduce claim recitations. In addition, even if a specific number of an introduced claim recitation is explicitly recited, those skilled in the art will recognize that such recitation should be interpreted to mean at least the recited number (e.g., the bare recitation of "two recitations," without other modifiers, means at least two recitations, or two or more recitations). Furthermore, in those instances where a convention analogous to "at least one of A, B, and C, etc," is used, in general such a construction is intended in the sense that one having skill in the art would understand the convention (e.g., "a system having at least one of A, B, and C" would include but not be limited to systems that have A alone, B alone, C alone, A and B together, A and C together, B and C together, and/or A, B, and C together, etc). In those instances where a convention analogous to "at least one of A, B, or C, etc.," is used, in general such a construction is intended in the sense one having skill in the art would understand the convention (e.g., "a system having at least one of A, B, or C" would include, but not be limited to, systems that have A alone, B alone, C alone, A and B together, A and C together, B and C together, and/or A, B, and C together, etc). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

In addition, where features or aspects of the disclosure are described in terms of Markush groups, those skilled in the art will recognize that the disclosure is also thereby described in terms of any individual member or subgroup of members of the Markush group.

As will be understood by one skilled in the art, for any and all purposes, such as in terms of providing a written description, all ranges disclosed herein also encompass any and all possible subranges and combinations of subranges thereof. Any listed range can be easily recognized as sufficiently describing and enabling the same range being broken down into at least equal halves, thirds, quarters, fifths, tenths, etc. As a non-limiting example, each range discussed herein can be readily broken down into a lower third, middle third, and upper third, etc. As will also be understood by one skilled in the art all language such as "up to," "at least," and the like include the number recited and refer to ranges that can be subsequently broken down into subranges as discussed above. Finally, as will be understood by one skilled in the art, a range includes each individual member. Thus, for example, a group having 1-3 cells refers to groups having 1, 2, or 3 cells. Similarly, a group having 1-5 cells refers to groups having 1, 2, 3, 4, or 5 cells, and so forth.

From the foregoing, various embodiments of the present disclosure have been described herein for purposes of illustration, and various modifications may be made without departing from the scope and spirit of the present disclosure. Accordingly, the various embodiments disclosed herein are not intended to be limiting, with the true scope and spirit being indicated by the following claims.

What is claimed:

1. A method to maintain cache coherence in a multi-core processor, the method comprising:
    maintaining a first bit-to-cache map, wherein the first bit-to-cache map comprises a first core identifier corresponding to a first core and a second core identifier corresponding to a second core, the first and second cores operable up to a first frequency;
    maintaining one or more entries in a first directory, a first entry of the one or more entries comprising a first sharer field and a first flag, the first sharer field comprising a first bit that corresponds to the first core identifier and a second bit that corresponds to the second core identifier, wherein the first entry is associated with a memory block cached by the multi-core processor, and wherein the first flag is associated with a set of cores of the multi-core processor including at least a third core;
    setting the first bit to a first value, wherein the first value indicates that the memory block is cached by the first core;
    setting the second bit to a second value, wherein the second value indicates that the memory block is cached by the second core; and
    setting the first flag, wherein the first flag indicates that the memory block is cached by at least the third core, wherein at least some cores of the set of cores are operable up to a second frequency less than the first frequency.

2. The method of claim 1, further comprising:
    identifying one or more cores that cache the memory block based at least in part on the first sharer field and the first bit-to-cache map.

3. The method of claim 1, further comprising:
    configuring a number of bits in the first sharer field based at least in part on a number of cores operable up to the first frequency.

4. The method of claim 1, further comprising:
    configuring a number of bits in the first sharer field based at least in part on a number of cores predicted to be operable up to the first frequency, the prediction based at least in part on a statistical distribution of maximum operating frequencies of other multi-core processors.

5. The method of claim 1, further comprising:
    populating the first bit-to-cache map during at least one of configuration of the multi-core processor or initialization of a computing system that comprises the multi-core processor.

6. The method of claim 1, further comprising:
    causing at least one core of the set of cores operable at the second frequency to enter a sleep state.

7. The method of claim 1, further comprising:
    maintaining a second bit-to-cache map comprising a third core identifier corresponding to the third core;
    maintaining a second entry in a second directory, wherein the second entry comprises a second sharer field, the second sharer field comprising a third bit corresponding to the third core; and setting the third bit to a third value, wherein the third value indicates that the memory block is cached by the third core.

8. The method of claim 1, further comprising:
maintaining a second bit-to-cache map comprising a third core identifier corresponding to the third core;
setting a field in the first entry, the field indicative of the first sharer field corresponding to the second bit-to-cache map; and
determining that the memory block is cached by a core operable up to the second frequency based at least in part on the first sharer field and the second bit-to-cache map.

9. A system, comprising:
a first core of a processor, the first core operable up to a first frequency;
a second core of the processor, the second core operable up to the first frequency; and
a cache coherence component coupled to the first and second cores and configured at least to:
access a first bit-to-cache map, wherein the first bit-to-cache map comprises a first core identifier that corresponds to the first core and a second core identifier that corresponds to the second core;
maintain one or more entries in a first directory, a first entry of the one or more entries comprising a first sharer field, the first sharer field comprising a first bit that corresponds to the first core identifier and a second bit that corresponds to the second core identifier, wherein the first entry is associated with a memory block cached by the processor;
set the first bit to a first value, wherein the first value indicates that the memory block is cached by the first core;
set the second bit to a second value, wherein the second value indicates that the memory block is cached by the second core; and
set a field of the first entry to indicate that the memory block is cached by a third core of the processor that is operable up to a second frequency, wherein the second frequency is less than the first frequency.

10. The system of claim 9, wherein the cache coherence component is further configured at least to:
identify one or more cores that cache the memory block based at least in part on the first sharer field and the first bit-to-cache map.

11. The system of claim 9, wherein the first sharer field is configured to have a number of bits based at least in part on a number of cores operable up to the first frequency.

12. The system of claim 9, wherein the first sharer field is configured to have a number of bits based at least in part on a number of cores predicted to be operable up to the first frequency.

13. The system of claim 9, wherein the cache coherence component is further configured at least to:
populate the first bit-to-cache map during at least one of configuration of the processor or initialization of the system.

14. The system of claim 9, further comprising a memory communicatively coupled to the cache coherence component, the memory configured to store information indicative of a number of cores operable up to the first frequency.

15. The system of claim 9, wherein the processor is configured at least to cause cores not represented in the first bit-to-cache map to enter a sleep state.

16. The system of claim 9, wherein the cache coherence component is further configured at least to:
access a second bit-to-cache map comprising a third core identifier that corresponds to the third core;
maintain a second entry in a second directory, wherein the second entry comprises a second sharer field, the second sharer field comprising a third bit that corresponds to the third core; and
set the third bit to a third value, wherein the third value indicates that the memory block is cached by the third core.

17. The system of claim 9, wherein the cache coherence component is further configured at least to:
access a second bit-to-cache map comprising a third core identifier that corresponds to the third core;
set a field in the first entry, the field indicative of the first sharer field corresponding to the second bit-to-cache map; and
determine that the memory block is cached by a core operable up to the second frequency based at least in part on the first sharer field and the second bit-to-cache map.

18. A non-transitory computer readable medium that includes computer-executable instructions stored thereon that are executable by a multi-core processor to:
maintain a first bit-to-cache map, wherein the first bit-to-cache map comprises a first core identifier corresponding to a first core of the multi-core processor and a second core identifier corresponding to a second core of the multi-core processor, the first and second cores operable up to a first frequency;
maintain one or more entries in a first directory, a first entry of the one or more entries comprising a first sharer field and a first flag, the first sharer field comprising a first bit that corresponds to the first core identifier and a second bit that corresponds to the second core identifier, wherein the first entry is associated with a memory block cached by the multi-core processor, and wherein the first flag is associated with a set of cores of the multi-core processor including at least a third core;
set the first bit to a first value, wherein the first value indicates that the memory block is cached by the first core;
set the second bit to a second value, wherein the second value indicates that the memory block is cached by the second core; and
set the first flag, wherein the first flag indicates that the memory block is cached by at least the third core, wherein each core of the set of cores is operable up to a second frequency less than the first frequency.

19. The non-transitory computer readable medium of claim 18, wherein computer executable instructions further comprises instructions executable by the multi-core processor to:
maintain a second bit-to-cache map comprising a third core identifier corresponding to the third core;
set a field in the first entry, the field indicative of the first sharer field corresponding to the second bit-to-cache map; and
determine that the memory block is cached by a core operable up to the second frequency based at least in part on the first sharer field and the second bit-to-cache map.

* * * * *